(12) United States Patent
Le Blaye

(10) Patent No.: US 6,209,822 B1
(45) Date of Patent: Apr. 3, 2001

(54) DEVICE FOR ATTACHING AN ENGINE TO AN AIRCRAFT STRUT

(75) Inventor: Sébastien Le Blaye, Villaudrie (FR)

(73) Assignee: Aerospatiale, Societe Nationale Industrielle, Paris (FR)

( * ) Notice: Subject to any disclaimer, the term of this patent is extended or adjusted under 35 U.S.C. 154(b) by 0 days.

(21) Appl. No.: 09/244,629

(22) Filed: Feb. 4, 1999

(30) Foreign Application Priority Data

Mar. 2, 1998 (FR) .................................................. 98 02483

(51) Int. Cl.[7] ...................................................... B64D 27/16
(52) U.S. Cl. ................................................ 244/54; 248/554
(58) Field of Search ................................. 244/53 R, 54, 244/55; 248/554, 557; 60/39.31

(56) References Cited

U.S. PATENT DOCUMENTS

| | | | |
|---|---|---|---|
| 4,044,973 | 8/1977 | Moorehead | 244/54 |
| 5,320,307 | * 6/1994 | Spofford et al. | 244/54 |
| 5,620,154 | * 4/1997 | Hey | 244/54 |
| 5,860,623 | * 1/1999 | Dunstan et al. | 244/54 |

FOREIGN PATENT DOCUMENTS

| | | |
|---|---|---|
| 0249553 | 12/1987 | (EP) . |
| 0583158 | 2/1992 | (EP) . |

* cited by examiner

*Primary Examiner*—Robert P. Swiatek
(74) *Attorney, Agent, or Firm*—Burns, Doane, Swecker & Mathis, LLP

(57) ABSTRACT

A device (14) for attaching or hooking an engine to an aircraft strut (10) comprises a circular arc-shaped fitting (16), formed from two elementary, coupled portions, which are also circular arc-shaped. These two elementary portions can be separate parts joined by bolts (24). The fitting (16) is fixed to the strut (10) by tension screws (30) and is solely connected to the engine by two connections or links (18). Each of these connections comprises a damping or shock absorber block (36) fixed to a base (40) connected to the engine and connected to one end of the fitting by a spindle (42). A holding part (44), fixed between the shock absorber block (36) and the base (40), is connected to the fitting by a joint (50) with clearance.

11 Claims, 5 Drawing Sheets

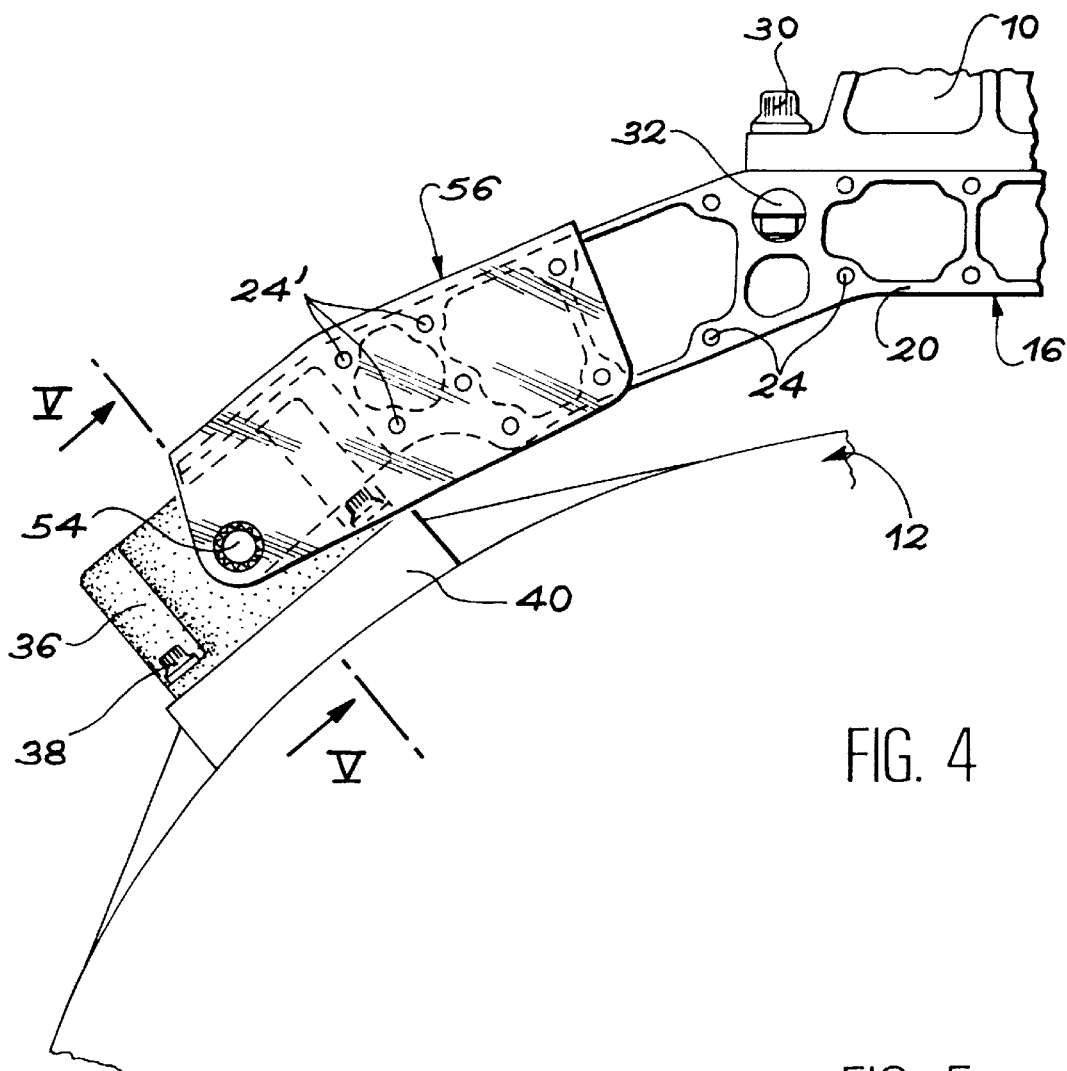
FIG. 4
FIG. 5
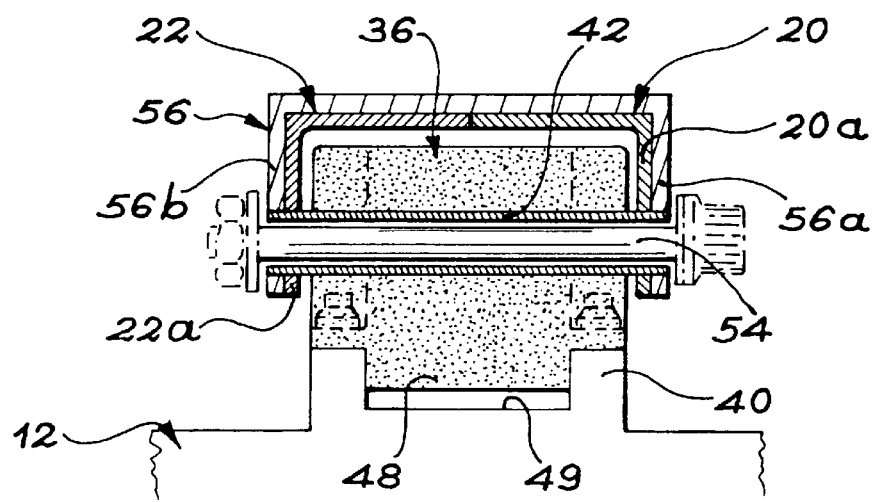

DEVICE FOR ATTACHING AN ENGINE TO AN AIRCRAFT STRUT

DESCRIPTION

1. Technical Field

The invention relates to a device for attaching or hooking an aircraft engine to a strut fixed to a structure of the aircraft, such as a wing or a fuselage element.

More specifically, the invention relates to an attachment device for absorbing or taking up lateral and vertical thrust forces and the torque produced by the engine and which must be retransmitted to the aircraft by means of the strut.

2. Prior Art

Each of the engines is suspended or attached in lateral manner to a strut, which is itself respectively fixed beneath the wing or to the aircraft fuselage.

The attachment systems connecting engines to struts are generally formed from two or three separate attachment devices. One of these devices is responsible for taking up the lateral and vertical thrust forces and the engine torque, which are produced by the engine, in order to retransmit them to the aircraft by means of the strut.

In the prior art, the attachment devices responsible for the taking up of the lateral and vertical thrust forces and the engine torque are essentially constituted by a monolithic or one-piece fitting, which is substantially circular arc-shaped. This structure is fixed to the strut in its central portion and connected to the engine at each of its ends by a one-piece attachment part. An attachment device of this type is e.g. described in U.S. Pat. No. 4,044,973.

As a result of the monolithic or one-piece character of the fitting and the attachment parts, a failure of any random one of these parts is liable to cast into doubt the integrity of the overall attachment device, thus seriously affecting aircraft safety.

In order to eliminate this risk, certain improved attachment devices add to the previously described structure a supplementary connection between the central portion of the fitting and the engine. This supplementary connection has sufficient clearance to ensure that it does not work during the normal operation of the attachment device. However, it does function when any random element of said device fractures.

The improved attachment devices incorporating such a supplementary connection still suffer from a certain number of disadvantages.

Firstly, the supplementary connection is not generally dimensioned in order to comply with the regulations, which require such a connection to be able to function in a completely satisfactory manner for thousands of flying hours corresponding to the inspection interval defined by said regulations for the aircraft in question.

Moreover, this solution requires the provision of a third attachment point on the engine, which leads to a modification of the latter.

In reality, the supplementary connection introduced into certain improved attachment devices already in existence only constitutes a rudimentary safety connection or link, intended solely to enable the aircraft to return to the ground under minimum safety conditions.

Thus, this connection is unable to comply with new demands laid down by the certification authorities in connection with the integrity of the device.

DESCRIPTION OF THE INVENTION

The object of the invention is to solve in a reliable and durable manner the safety problems caused by existing aircraft engine attachment devices, but without leading to any modification to the engines.

In other words, the object of the invention is an aircraft engine attachment device, whose original design enables it to maintain its integrity and consequently does not bring into doubt the safety of the aircraft, in the case of a failure of any one of its components, without it being necessary to add a supplementary connection to the two connections normally connecting the fitting to the engine.

According to the invention, this result is obtained by means of a device for the attachment of an engine to a strut fixed to an aircraft, said device comprising a substantially circular arc-shaped fitting having a central part fixed to the strut and two end parts connectable to the engine by connecting means, characterized in that the central part and the end parts of the fitting are formed both in two elementary portions thereof, able to individually transmit to the strut the stresses produced by the engine, the fitting being solely connected to the engine by said connecting means, and each of them includes a holding part, which is non-working in normal operation, able to transmit said stresses in the case of the fracture of another part of said connecting means.

The two elementary portions of the fitting, which can be implemented in the form of a single part or in the form of two separate parts, ensure the redundancy of the part of the device constituted by the fitting.

Moreover, the holding part integrated into each of the two connections between the fitting and the engine, ensures the redundancy of these connections.

Thus, the sought objective is achieved, no matter what the nature of the possibly defective part and without any modification being required to the engine.

In a preferred embodiment of the invention, the two elementary portions of the fitting are constituted by two separate parts, connected to one another by fixing means distributed over the entire length of said parts.

The fixing means connecting the separate parts of the fitting can in particular comprise bolts passing through said parts.

Each of the elementary portions of the fitting is itself fixed to the strut by at least two tension screws. Thus, the sought redundancy is also obtained in the connection provided between each of the portions of the fitting and the strut.

In the preferred embodiment of the invention, each of the two connecting means comprises a shock absorber block, fixed to the engine by a tension screw system and penetrating a female fork formed in a corresponding end part of the fitting, a spindle traversing without clearance the shock absorber block and, on either side of the latter, flanks of said female fork, formed in each of the two elementary portions of the fitting.

The non-working holding part is then advantageously constituted by a plate, fixed between the shock absorber block and the engine by the aforementioned tension screws and connected to the two elementary portions of the fitting by a joint with clearance.

The joint with clearance is then preferably a hinge-type joint, including multiple forks formed on the two parts constituted by the holding part and the fitting, said multiple forks intersecting with clearance. A second spindle traverses the multiple forks and is fixed to one of the two parts and traverses the other with clearance.

According to another embodiment of the invention, the spindle connecting the shock absorber block to one of the two end parts of the fitting is a hollow, external spindle, traversed with clearance by an internal spindle forming the non-working, holding part.

In this case, three different variants can be envisaged.

According to a first variant, a plate having a U-shaped cross-section simultaneously surrounds the two elementary portions of the fitting, at each end part thereof including said female fork, said plate being fixed to the two elementary portions of the fitting, apart from said fork, by a series of bolts successively traversing the two elementary portions and, on the other side thereof, two flanges of said plate, the hollow, external spindle also traversing without clearance each of said plate flanges.

According to a second variant, two substantially planar plates are fixed on either side of each end part of the fitting, apart from said female fork, by a system of bolts successively traversing the two elementary portions of the fitting and, on either side thereof, said plates, the hollow, external spindle also traversing without clearance each of the plates.

Finally, according to a third variant, each of the elementary portions of the fitting has, at each end portion thereof, a separate female fork penetrated by a part of the shock absorber block, the two female forks and the two parts of the shock absorber block being traversed by said hollow, external spindle.

BRIEF DESCRIPTION OF THE DRAWINGS

The invention is described in greater detail hereinafter relative to non-limitative embodiments and with reference to the attached drawings, wherein show:

FIG. 4 A fragmentary front view illustrating a second embodiment of the device according to the invention.

FIG. 5 A cross-sectional view along line V—V of FIG. 4.

DETAILED DESCRIPTION OF EMBODIMENTS OF THE INVENTION

Figure 1:
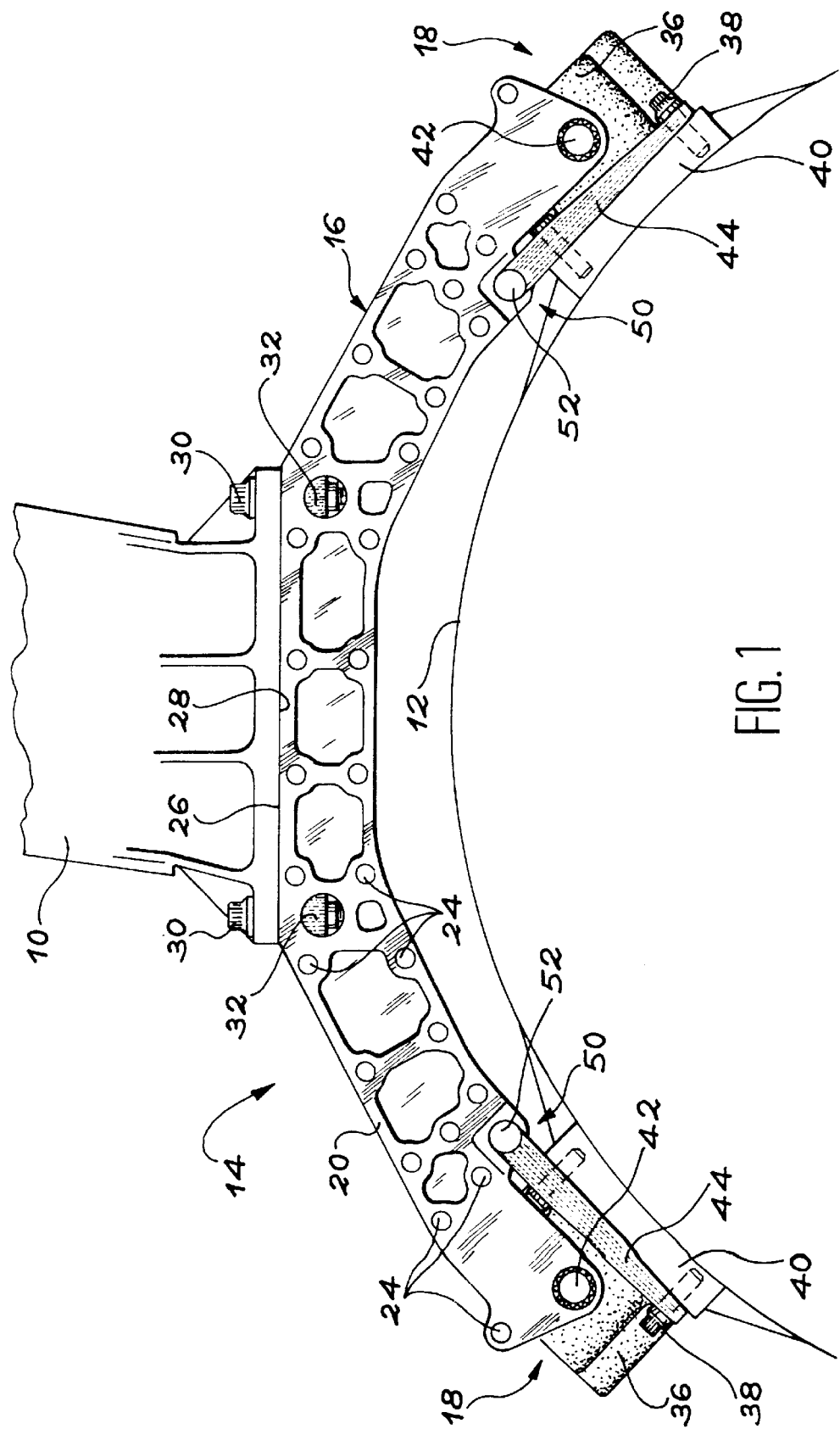
FIG. 1 A front view of an aircraft engine attachment device in a first embodiment of the invention.

In FIG. 1, reference numeral 10 designates a strut to be fixed in known manner to an aircraft structure, such as a wing or fuselage element thereof. More specifically, numeral 10 corresponds to the part of the strut designed for absorbing or taking up the lateral and vertical thrust forces and the engine torque produced by a not shown engine, so that its forces and stresses are retransmitted to the aircraft by means of the strut 10.

In FIG. 1, reference numeral 12 designates an annular part forming an integral portion of the non-rotary structure of the engine, or which is intended to be fixed to said structure according to known methods not forming part of the present invention. Only the portion of the part 12 adjacent to the strut 10 is illustrated. It should be noted that part 12, by which the engine is attached or hooked to the strut 10, can be located either to the front or to the rear of the engine, the dimensions of the different parts being adapted as a consequence thereof.

The connection between the strut 10 and the part 12 is ensured by an attachment or hooking device 14 according to the invention. It is pointed out that the function of the attachment device 14 is to take up the lateral and vertical thrust forces and the engine torque, in order to retransmit them to the aircraft structure through the strut 10. All the other stresses and forces are transmitted by other, not shown attachment devices, which can be constructed in accordance with various known procedures and which do not form part of the invention.

The attachment device 14 is symmetrical with respect to a plane passing through the axis of the engine. For this reasons, the same numerical references are used for designating identical parts symmetrical with respect to said plane. Thus, the perspective views of FIGS. 2 and 3 can apply to one or other of the end portions of the attachment device 14 on either side of its plane of symmetry.

The attachment device 14 according to the invention comprises a fitting 16, which is substantially circular arc-shaped in front view, i.e. observed in accordance with the axis of the engine. The attachment device 14 also comprises connecting means 18 connecting each of the ends of the fitting 16 to the annular part 12 connected to the engine.

Figure 2:
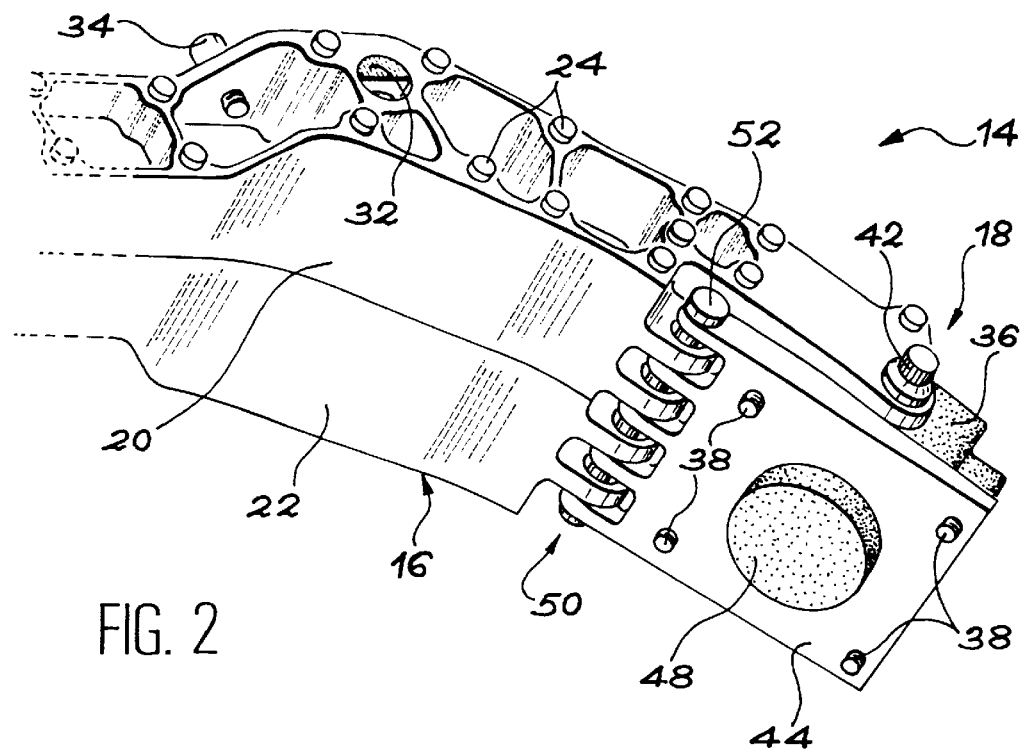
FIG. 2 A view from below and in perspective of the right-hand half of the device of FIG. 1.
Figure 3:
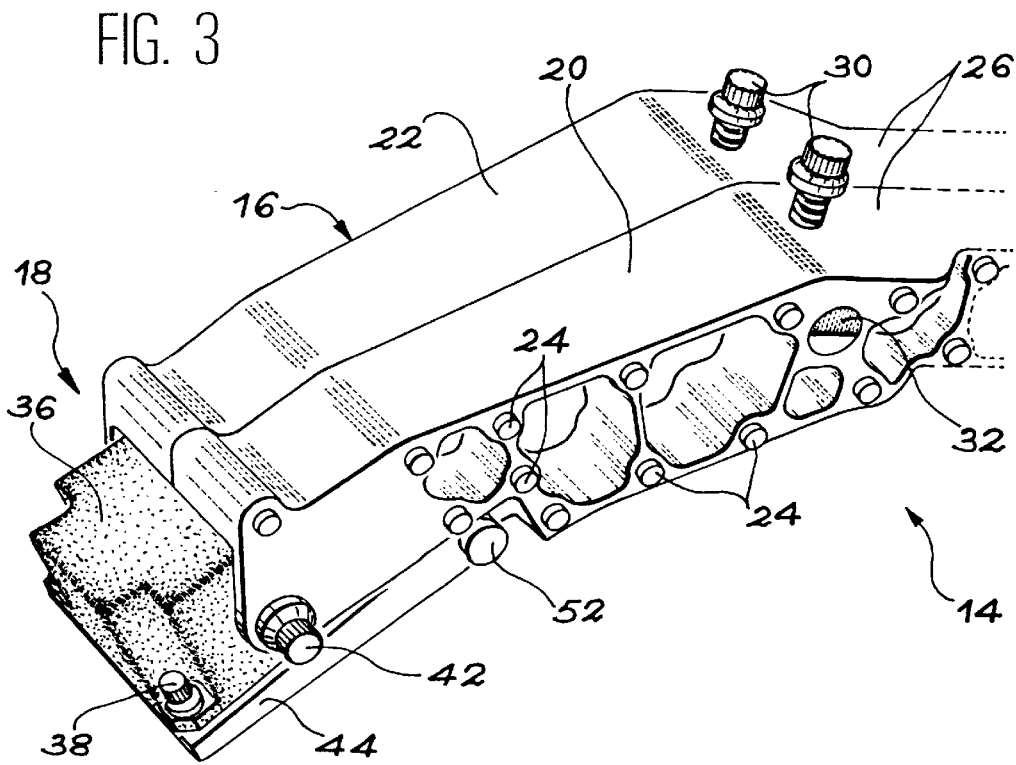
FIG. 3 A top view, in perspective, showing the left-hand half of the device of FIG. 1.

As is more particularly illustrated in FIGS. 2 and 3, the fitting 16 is formed by two separate, circular arc-shaped parts 20 and 22, which are coupled to one another along a plane perpendicular to the axis of the engine and they have a mirror symmetry with respect to said plane. The two parts 20 and 22 forming the fitting 16 are connected to one another by fixing means constituted by a system of bolts 24, which successively traverse the two parts over their entire thickness and parallel to the axis of the engine. These bolts 24 are distributed over the entire length and width of the parts 20 and 22, as illustrated by FIGS. 1 to 3.

According to a feature of the invention, each of the parts 20 and 22 forming the fitting 16 is dimensioned in such a way as to be able to individually transmit to the strut 10 the maximum stresses liable to be produced by the engine when the aircraft is in flight.

In a not shown constructional variant, the same result can be obtained by implementing the fitting 16 in one piece including two elementary, circular arc-shaped portions, whose structure and mechanical behaviour are comparable to those of the separate parts 20 and 22. These two elementary portions are then connected to one another by connecting parts made in one piece with the two elementary portions and fulfilling the same function as the bolts 24. These connecting parts can be placed partly or totally along the contour of the two elementary portions or at any other appropriate location. They enable the fitting 16 to behave like a single part, whilst preserving the integrity of the other elementary portion, when one of said portions is defective.

In its central part, the fitting 16 has a planar, outer face 26 (FIGS. 1 and 3), which is to be fixed to a planar face 28 (FIG. 1) of the strut 10. As shown in FIG. 3, the planar face 26 is half formed on part 20 and half formed on part 22.

The fitting 16 is fixed to the strut 10 by four tension screws 30, which traverse facing bores formed in the strut 10 and in each of the parts 20 and 22 of the fitting 16 and are screwed into four barrel nuts 32, placed pairwise in bores successively traversing the parts 20 and 22 parallel to the engine axis. Locking is ensured by the bearing of the screw heads 30 on the surfaces provided for this purpose on the strut 10.

More specifically and is more particularly illustrated in FIGS. 1 and 3, two of the screws 30 and two of the nuts 32 ensure the fixing of each of the parts 20 and 22 of the fitting 16 to the strut 10.

The shear stresses between parts 20 and 22 of the fitting 16 and the strut 10 are taken up by a pin 34 (FIG. 2) operating solely in shear. In the embodiment illustrated in FIG. 2, the pin 34 is fixed in a hole of the strut 10 and pressed into a facing hole machined in part 22 of fitting 16. Conversely, the pin 34 could be fixed to one or other of the parts of the fitting and pressed into a hole in the strut.

According to the invention, the connections between the fitting 16 and the annular part 12 connected to the engine are limited to two connecting points materialized by the connecting means 18 interposed between the end parts of the fitting 16 and the part 12.

In the first embodiment of the invention illustrated in FIGS. 1 to 3, each of the connecting means 18 comprises a damping or shock absorber block 36 for preventing any engine vibrations being transmitted to the fitting 16. The shock absorber blocks 36 can have a random structure able to fulfil the desired function, in accordance with prior art procedures.

Each of the shock absorber blocks 36 is fixed, e.g. by means of four tension screws 38, to a base 40 provided for this purpose on the annular part 12 connected to the engine.

Each of the shock absorber blocks 36 also penetrates a female fork formed in an end part of the fitting 16. More specifically, each shock absorber block 36 is connected to the corresponding female fork by a spindle 42 oriented parallel to the engine axis. Said spindle 42 traverses without clearance the shock absorber block 36 and, on either side thereof, the two flanks of the aforementioned female fork, respectively formed in each of the separate parts 20 and 22.

In the embodiment illustrated in FIGS. 1 to 3, a holding part constituted by a plate 44 is interposed between each of the shock absorber blocks 36 and the base 40 to which said block is fixed. More specifically, the plate 44 is fixed between the shock absorber block 36 and the base 40 by four screws 38, which traverse four holes provided for this purpose in the plate 44.

To ensure that the screws 38 only operate in tension, the shock absorber block 36 has a projecting part 48 (FIG. 2), e.g. shaped like a cylinder, which passes through a circular hole formed for this purpose in the plate 44 and fitted without clearance in a complementary, not shown recess on the base 40. The projecting portion 48 of each of the shock absorber blocks 36 thus takes up the shear stresses.

As is more particularly illustrated in FIG. 2, each of the plates 44 is connected to the two parts 20 and 22 of the fitting 16 by a hingetype joint with clearance 50.

This joint 50 comprises a spindle 52 completely traversing multiple forks formed on the plate 44 and parts 20 and 22 and intersects with clearance. The spindle 52 is oriented parallel to the engine axis. It can be fixed to the plate 44 and can traverse with clearance the forks formed in the parts 20 and 22 of the fitting 16. Without passing beyond the scope of the invention, a reverse arrangement can be used.

The clearances or tolerances provided in the joint 50 are dimensioned in such a way that the latter transmits no force and is not working when the device is functioning normally.

It should be noted that the hinge-type joint 50 can be replaced by a simple joint or articulation between a male fork and a female fork, without passing beyond the scope of the invention.

The attachment device according to the invention described herein-before with reference to FIGS. 1 to 3 ensures the transmission of lateral and vertical thrust forces and engine torque between the engine and the strut, using only two anchoring points on the engine and in accordance with an arrangement such that one of the components of the device becoming defective does not cast into doubt the integrity thereof.

Thus, in the case of the fracture of a single element such as a shock absorber block 36 or a spindle 42, or in the case of the failure of one of the forks forming the end parts of the fitting 16, the connection and transfer of the forces between the engine and the two parts 20 and 22 forming the fitting 16 are still ensured, through the joint 50 and the plate 44, after taking up clearances. This reasoning is applicable to each of the ends of the device. The integrity of the device is also preserved in the case of a failure of one or other of the two parts 20 and 22 forming the fitting 16. Consequently, no matter what part is defective, the engine is maintained in a reliable and safe manner in its normal operating position.

A description will now be given with successive reference to FIGS. 4 to 9 of a second embodiment of the invention, in which the plates 44 are eliminated. This second embodiment is only applicable in the case where the shock absorber blocks 36 do not have a fracture risk or are intrinsically designed in a redundant manner.

Figure 6:
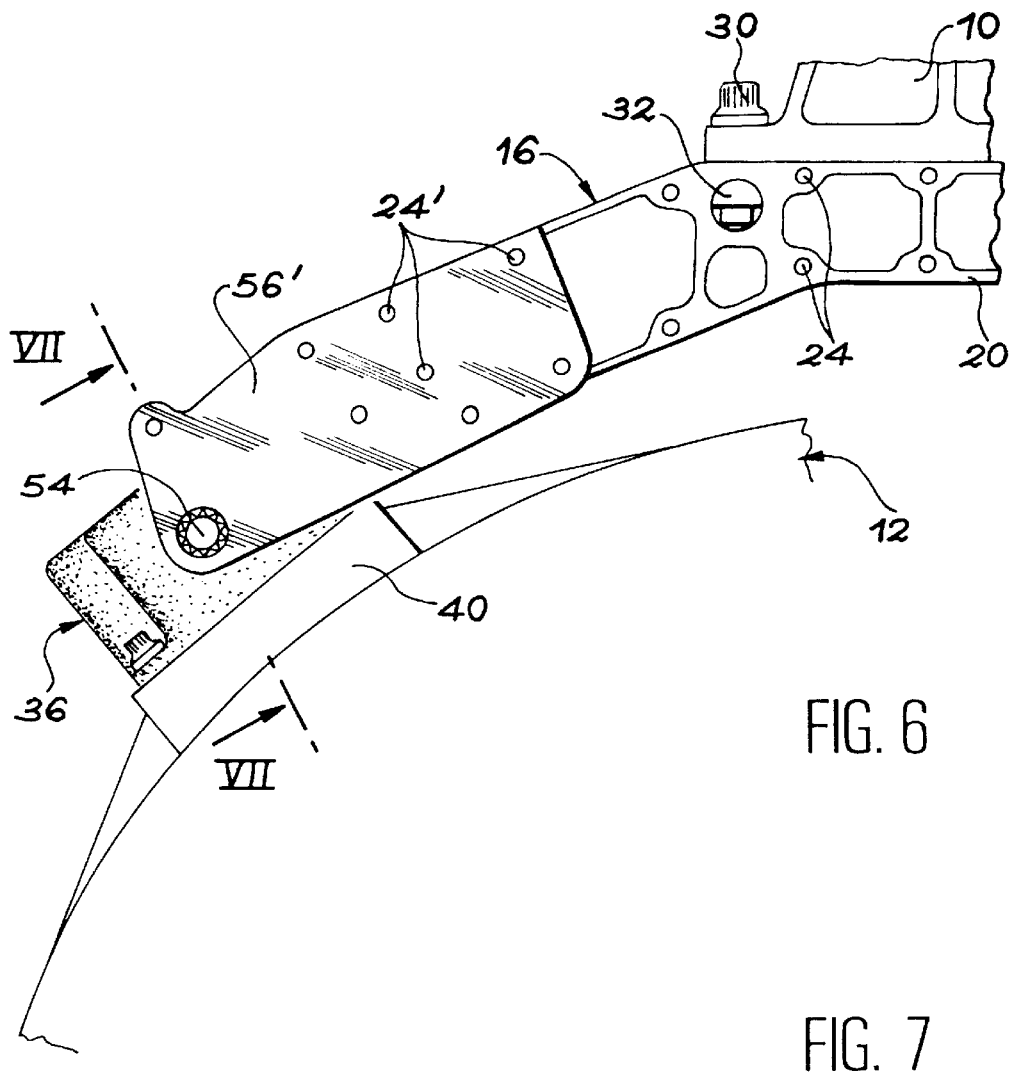
FIG. 6 A view comparable to FIG. 4, illustrating a variant of the second embodiment of the invention.
Figure 7:
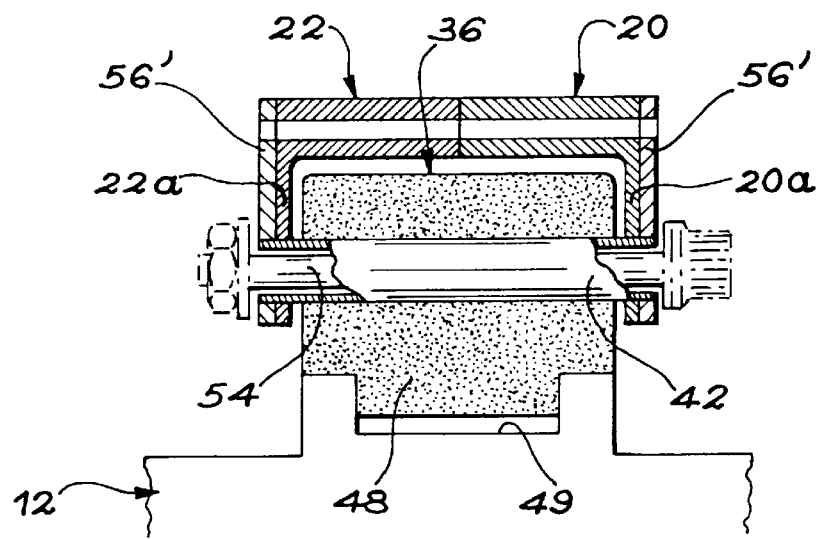
FIG. 7 A cross-sectional view along line VII—VII of FIG. 6.
Figure 8:
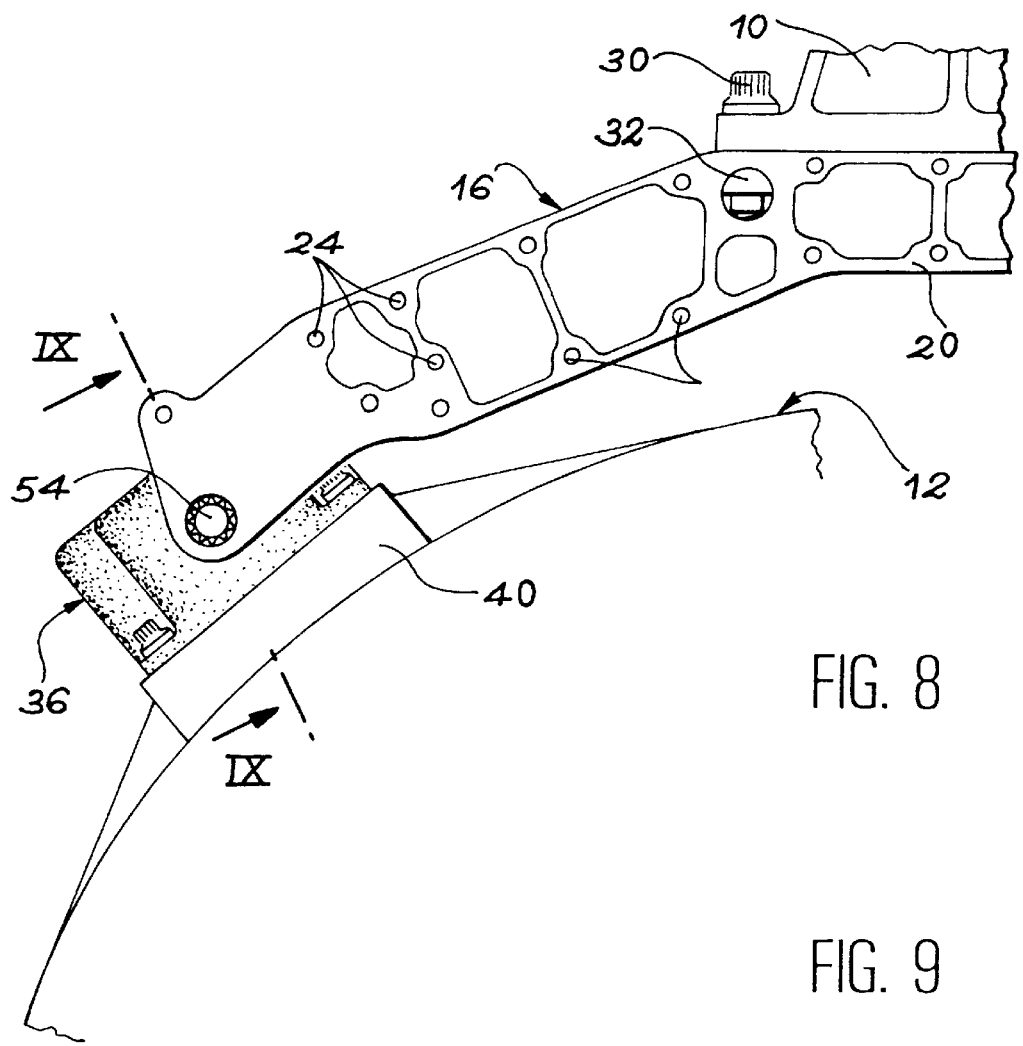
FIG. 8 A view comparable to FIGS. 4 and 6 illustrating another variant of the second embodiment of the invention.
Figure 9:
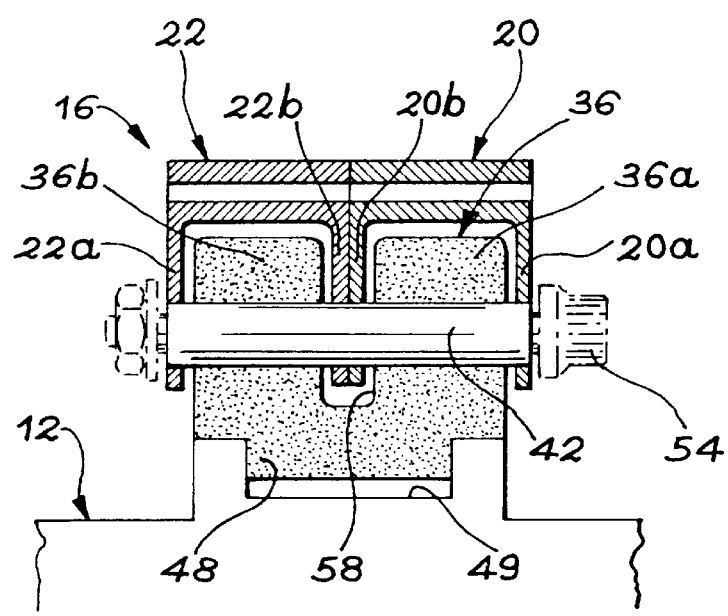
FIG. 9 A cross-sectional view along line IX—IX of FIG. 8.

In the embodiment illustrated in FIGS. 4 to 9, each of the shock absorber blocks 36 is directly fixed to a corresponding base 40 of part 12 by means of four screws 38. FIGS. 5, 7 and 9 show that the projecting part 48 of each of the shock absorber blocks 36 is fitted without clearance into a recess 49 of the base 40.

In addition, the spindle 42 ensuring the clearance-free connection between each shock absorber block 36 and parts 20 and 22 forming the fitting 16 is a hollow, external spindle. This hollow, external spindle 42 is traversed with a predetermined clearance, both in the radial and in the axial direction, by an internal spindle 54. This spindle 54 forms a holding part, which is non-working in normal operation. It is dimensioned so as to be able to transmit the maximum stresses liable to be produced in flight by the engine, in the case of the fracture of the hollow, external spindle 42, following the taking up of clearances.

In the variant of said second embodiment of the invention illustrated in FIGS. 4 and 5, the two separate parts 20 and 22 forming the fitting 16 are simultaneously surrounded, in their end parts including the female fork in which penetrates the shock absorber block 36, by a plate 56 having a U-shaped cross-section. In its part not surrounding the female fork formed in the fitting 16, the plate 56 is fixed to the two parts 20 and 22 of the fitting by a series of bolts 24'. The bolts 24' are comparable to the bolts 24 interconnecting the two parts 20 and 22. They traverse both the flanks 20a and 22a of the parts 20 and 22 and the two flanges 56a and 56b of the plates 56 (FIG. 5).

Moreover and as illustrated in FIG. 5, the hollow, external spindle 42 also traverses without clearance the two flanges 56a and 56b of the plate 56.

In the arrangement described hereinbefore with reference to FIGS. 4 and 5, in the case of the fracture of the flanks 20a and 22a of the parts 20 and 22 forming the fitting 16, the transfer of the forces and the connection between the engine and the strut 10 are ensured by the shock absorber block 36, the hollow, external spindle 42, the other intact flank 20a or 22a of the parts 20 and 22, the plate 56 with a U-shaped cross-section, the bolts 24' and the central part of the fitting 16.

In the variant of the second embodiment illustrated in FIGS. 6 and 7, the plate 56 with the U-shaped cross-section is replaced by two substantially planar plates 56', fixed on either side of the end portions of the parts 20 and 22 of the fitting 16, apart from the female fork formed in the latter.

The two plates 56' are fixed to the parts 20 and 22 by a system of bolts 24', which successively traverse the flanks 20a and 20b formed in the two parts and, on either side of said flanks, the plates 56', as in the preceding variant.

In the same way, the hollow, external spindle 42 traverses without clearance each of the plates 56', as illustrated in FIG. 7.

In the variant of the second embodiment illustrated in FIGS. 8 and 9, the plates 56 and 56' of the two preceding variants are eliminated. In this case, the redundant character of the connection between the shock absorber block 36 and each of the parts 20 and 22 of the fitting 16 is obtained by having a female fork in each of the said parts 20 and 22, as illustrated in FIG. 9. The adjacent flanks 20b, 22b of these female forks then penetrate a groove 58 formed in the shock absorber block 36.

More specifically and as illustrated in FIG. 9, the hollow, external spindle 42 then successively traverses without clearance the flank 20a turned towards the outside of the fitting of the fork formed in the part 20, a first portion 36a of the shock absorber block 36, the two adjacent flanks 20b,22b of the forks formed in the parts 20 and 22, a second portion 36b of the shock absorber block 36 and the flank 22a turned towards the outside of the fitting of the fork formed in the part 22.

The provision of a separate fork in each of the parts 20 and 22 of the fitting makes it possible to ensure the desired redundancy. Thus, the fracture of one of the parts 20 and 22 would not bring about any interruption to the connection between the engine and the strut.

The above description shows that, no matter what the embodiment of the invention, the connection between the engine and the strut connected to the aircraft is preserved in the case of the fracture of any random one of the components of these devices. Thus, in all cases, the attachment device remains operational and in accordance with the regulations in force. This result is obtained by only using on the engine the two attachment points conventionally employed with the existing devices.

It should be noted that in the embodiment described relative to FIGS. 1 to 3, the attachment device has smaller overall dimensions than in the embodiment of FIGS. 4 to 9, particularly at the locations of the connections to the engine.

However, the second embodiment of the invention makes it possible to eliminate the plates interposed between the shock absorber blocks and the bases connected to the engine. This eliminates the clearances inherent in this solution and consequently simplifies the design calculations for the components of the device and the engine, as a result of the fact that, when they exist, these clearances induce a dynamic coefficient which must be taken into account in said calculations.

What is claimed is:

1. Device for the attachment of an engine to a strut fixed to an aircraft, said device comprising a substantially circular arc-shaped fitting having a central part fixable to the strut and two end parts connectable to the engine by connecting means, wherein the central part and the end parts of said arc-shaped fitting are formed both in two elementary portions thereof, able to individually transmit to the strut the stresses produced by the engine, the fitting being connectable to the engine by said connecting means, and wherein the central part and end parts each include a holding part, which is non-working in normal operation, and able to transmit said stresses in the case of the fracture of another part of said connecting means.

2. Device according to claim 1, wherein the two elementary portions of the fitting are two separate parts, connected to one another by fixing means distributed over the entire length of these parts.

3. Device according to claim 2, wherein the fixing means comprise bolts traversing the two separate parts of the fitting.

4. Device according to claim 1, wherein each of the elementary portions is separately fixed to the strut by at least two tension screws.

5. Device according to claim 1, wherein each of the two connecting means comprises a shock absorber block, fixed to the engine by a system of tension screws, and penetrating a female fork formed in a corresponding end part of the fitting, a spindle, traversing without clearance the shock absorber block and, on either side of the latter, flanks of said female fork, formed in each of the two elementary portions of the fitting.

6. Device according to claim 5, wherein the non-working, holding part is a plate, fixed between the shock absorber block and the engine by said system of tension screws and connected to the two elementary portions of the fitting by a joint with clearance.

7. Device according to claim 6, wherein the joint with clearance is a hinge-type joint, including multiple forks formed on the two parts constituted by the holding part and the fitting and which intersect with clearance, a second spindle traversing the multiple forks being fixed to one of the parts and traversing the other with clearance.

8. Device according to claim 5, wherein said spindle is a hollow, external spindle, traversed with clearance by an internal spindle forming the non-working, holding part.

9. Device according to claim 8, wherein a plate with a U-shaped cross-section simultaneously surrounds the two elementary portions of the fitting, at each end part thereof, including said female fork, said plate being fixed to the two elementary portions of the fitting, apart from said fork, by a series of bolts successively traversing the two elementary portions and, on either side thereof, two flanges of said plate, said hollow, external spindle also traversing without clearance each of the flanges of the plate.

10. Device according to claim 8, wherein two substantially planar plates are fixed on either side of each end portion of the fitting, apart from said female fork, by a system of bolts successively traversing the two elementary portions of the fitting and, on either side thereof, said plates, said hollow, external spindle also traversing without clearance each of the plates.

11. Device according to claim 8, wherein each of the elementary portions of the fitting has, at each end part thereof, a female fork penetrated by a portion of the shock absorber block, the two female forks and the two portions of the shock absorber block being traversed by said hollow, external spindle.

* * * * *